US012482361B1

(12) United States Patent
Bruno et al.

(10) Patent No.: US 12,482,361 B1
(45) Date of Patent: Nov. 25, 2025

(54) SYSTEMS AND METHODS FOR DETECTING ELEVATED COLLISION RISK TO A SECURED MARINE VESSEL USING A VISION SYSTEM OF THE MARINE VESSEL

(71) Applicant: Brunswick Corporation, Mettawa, IL (US)

(72) Inventors: Corey L. Bruno, Fond du Lac, WI (US); Timothy S. Reid, Eden, WI (US)

(73) Assignee: Brunswick Corporation, Mettawa, IL (US)

( * ) Notice: Subject to any disclaimer, the term of this patent is extended or adjusted under 35 U.S.C. 154(b) by 140 days.

(21) Appl. No.: 18/481,742

(22) Filed: Oct. 5, 2023

(51) Int. Cl.
*G08G 3/02* (2006.01)
*G06V 20/56* (2022.01)

(52) U.S. Cl.
CPC ............... *G08G 3/02* (2013.01); *G06V 20/56* (2022.01)

(58) Field of Classification Search
CPC ................................. G08G 3/02; G06V 20/56
See application file for complete search history.

(56) References Cited

U.S. PATENT DOCUMENTS

| | | |
|---|---|---|
| 6,273,771 B1 | 8/2001 | Buckley et al. |
| 7,552,057 B2 * | 6/2009 | McGwin, Jr. .......... G06Q 10/06 705/1.1 |
| 9,927,520 B1 | 3/2018 | Ward et al. |
| 10,259,555 B2 | 4/2019 | Ward et al. |
| 10,322,787 B2 | 6/2019 | Ward |
| 10,429,845 B2 | 10/2019 | Arbuckle et al. |
| 11,373,537 B2 | 6/2022 | Derginer et al. |
| 11,403,955 B2 | 8/2022 | Derginer et al. |
| 2014/0266793 A1 * | 9/2014 | Velado .................... B63B 79/10 340/870.16 |
| 2017/0293302 A1 * | 10/2017 | Johnson ............... G05D 1/0206 |
| 2020/0369351 A1 * | 11/2020 | Behrendt ............... G06V 20/00 |

* cited by examiner

*Primary Examiner* — Davetta W Goins
*Assistant Examiner* — Sharmin Akhter
(74) *Attorney, Agent, or Firm* — Andrus Intellectual Property Law, LLP

(57) ABSTRACT

A system for detecting collision risk to a secured marine vessel using a vision system of the marine vessel is provided, the system comprising: a plurality of cameras, including at least a first camera and a second camera, wherein each of the plurality of cameras is configured to be mounted to the marine vessel with an associated field of view of an environment of the marine vessel; one or more hardware processors configured to: determine that the marine vessel is secured; determine, based on image data generated by one or more of the plurality of cameras, that the marine vessel is at an increased risk of collision; and generate a collision alert based on the increased risk of collision.

20 Claims, 4 Drawing Sheets

SYSTEMS AND METHODS FOR DETECTING ELEVATED COLLISION RISK TO A SECURED MARINE VESSEL USING A VISION SYSTEM OF THE MARINE VESSEL

FIELD

The present disclosure generally relates to systems and methods for detecting elevated collision risk to a secured marine vessel using a vision system of the marine vessel.

BACKGROUND

The following U.S. Patents are incorporated herein by reference, in entirety:

U.S. Pat. No. 9,927,520 discloses a method of detecting a collision of the marine vessel, including sensing using distance sensors to determine whether an object is within a predefined distance of a marine vessel, and determining a direction of the object with respect to the marine vessel. The method further includes receiving a propulsion control input at a propulsion control input device, and determining whether execution of the propulsion control input will result in any portion of the marine vessel moving toward the object. A collision warning is then generated.

U.S. Pat. No. 10,322,787 discloses a system for maintaining a marine vessel in a body of water at a selected position and orientation, including a global positioning system that determines a global position and heading of the vessel and a proximity sensor that determines a relative position and bearing of the vessel with respect to an object near the vessel. A controller operable in a station-keeping mode is in signal communication with the GPS and the proximity sensor. The controller chooses between using global position and heading data from the GPS and relative position and bearing data from the proximity sensor to determine if the vessel has moved from the selected position and orientation. The controller calculates thrust commands required to return the vessel to the selected position and orientation and outputs the thrust commands to a marine propulsion system, which uses the thrust commands to reposition the vessel.

U.S. Pat. No. 10,259,555 discloses a method for controlling movement of a marine vessel near an object, including accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

U.S. Pat. No. 10,429,845 discloses a marine vessel powered by a marine propulsion system and movable with respect to first, second, and third axes that are perpendicular to one another and define at least six degrees of freedom of potential vessel movement. A method for controlling a position of the marine vessel near a target location includes measuring a present location of the marine vessel, and based on the vessel's present location, determining if the marine vessel is within a predetermined range of the target location. The method includes determining marine vessel movements that are required to translate the marine vessel from the present location to the target location. In response to the marine vessel being within the predetermined range of the target location, the method includes automatically controlling the propulsion system to produce components of the required marine vessel movements one degree of freedom at a time during a given iteration of control.

U.S. Pat. No. 11,373,537 discloses a propulsion control system on a marine vessel that includes at least one propulsion device configured to propel the marine vessel, at least one input device manipulatable to provide user control input to control a movement direction and velocity of the marine vessel, at least one proximity sensor system configured to generate proximity measurements describing a proximity of an object with respect to the marine vessel, and a controller. The controller is configured to limit user input authority over propulsion output in a direction of the object by at least one propulsion device based on the proximity measurement so as to maintain the marine vessel at least a buffer distance from the object, and then to suspend the maintenance of the buffer distance from the object upon receipt of a user-generated instruction to do so. Upon receipt of a user control input via the user input device to move the marine vessel in the direction of the object, the controller controls the at least one propulsion device based on the user control input such that the marine vessel approaches and impacts the object.

U.S. Pat. No. 11,403,955 discloses a propulsion control system on a marine vessel that includes at least one propulsion device configured to propel the marine vessel and at least one proximity sensor system configured to generate proximity measurements describing a proximity of an object with respect to the marine vessel. The system further includes a controller configured to receive proximity measurements, access a preset buffer distance, and calculate a velocity limit in a direction of the object for the marine vessel based on the proximity measurements and the preset buffer distance so as to progressively decrease the velocity limit as the marine vessel approaches the preset buffer distance from the object.

SUMMARY

In accordance with some embodiments of the disclosed subject matter, a system for detecting collision risk to a secured marine vessel using a vision system of the marine vessel is provided, the system comprising: a plurality of cameras, including at least a first camera and a second camera, wherein each of the plurality of cameras is configured to be mounted to the marine vessel with an associated field of view of an environment of the marine vessel; one or more hardware processors configured to: determine that the marine vessel is secured; determine, based on image data generated by one or more of the plurality of cameras, that the marine vessel is at an increased risk of collision; and generate a collision alert based on the increased risk of collision.

In some embodiments, the one or more hardware processors are further configured to: determine that the marine vessel is occupied; and cause a device associated with the marine vessel to present the collision alert.

In some embodiments, the one or more hardware processors are further configured to: determine, after a predetermined period of time, that a user acknowledgment of the collision alert has not been received; and in response to determining that the user acknowledgment of the collision alert has not been received, cause the collision alert to be transmitted to a remote computing device associated with a particular user.

In some embodiments, the one or more hardware processors are further configured to: determine that the marine vessel is unoccupied; and cause the collision alert to be transmitted to a remote computing device associated with a particular user.

In some embodiments, the collision alert comprises an image captured by one of the plurality of cameras.

In some embodiments, the one or more hardware processors are further configured to: receive, via a user interface presented by a computing device, input indicating that the marine vessel is secured; and in response to receiving the input, determine that the marine vessel is secured.

In some embodiments, the one or more hardware processors are further configured to: cause the plurality of cameras to capture image data at a reduced rate based on the determination that the marine vessel is secured.

In some embodiments, the one or more hardware processors are further configured to: cause the plurality of cameras to capture image data at a first rate during a period when the marine vessel is being operated and is underway, wherein the reduced rate captures image data at no more than ten percent of the first rate.

In some embodiments, the first rate is at least 30 times per second.

In some embodiments, the one or more hardware processors are further configured to: determine, based on the image data generated by the one or more of the plurality of cameras, that the marine vessel is adrift, wherein the increased risk of collision is based on the determination that the marine vessel is adrift; and in response to determining that the marine vessel is adrift, include an indication in the collision alert that the marine vessel is adrift.

In some embodiments, the one or more hardware processors are further configured to: determine, after a predetermined period of time, that a user acknowledgment of the collision alert has not been received; and in response to determining that the user acknowledgment of the collision alert has not been received, cause the collision alert to be transmitted to a device associated with emergency services.

In some embodiments, the one or more hardware processors are further configured to: determine, based on the image data generated by the one or more of the plurality of cameras, that a distance to an object in the environment of at least a predetermined size has decreased by at least a threshold amount within a predetermined period of time, wherein the increased risk of collision is based on the determination that the distance to the object in the environment has decreased by at least the threshold amount within the predetermined period of time.

In some embodiments, the one or more hardware processors are further configured to: determine a position of the marine vessel at a time at which the marine vessel was secured; determine that the marine vessel has moved at least a predetermined distance from the position of the marine vessel at the time at which the marine vessel was secured; and in response to determining that the marine vessel has moved at least the predetermined distance, cause the plurality of cameras to capture image data.

In some embodiments, the one or more hardware processors are further configured to: in response to determining that the marine vessel is at the increased risk of collision, cause the plurality of cameras to capture image data at an increased rate for at least a predetermined period of time; and determine, based on image data generated by one or more of the plurality of cameras during the predetermined period of time, a collision is likely within a second predetermined period of time.

In accordance with some embodiments of the disclosed subject matter, a method for detecting collision risk to a secured marine vessel using a vision system of the marine vessel is provided, the method comprising: determining that the marine vessel is secured; determining, based on image data generated by one or more of a plurality of cameras, that the marine vessel is at an increased risk of collision; and generating a collision alert based on the increased risk of collision.

Various other features, objects, and advantages of the disclosed subject matter can be more fully appreciated with reference to the following description taken together with the drawings.

BRIEF DESCRIPTION OF THE DRAWINGS

The present disclosure is described with reference to the following drawings.

DETAILED DESCRIPTION

Many boat owners leave their boats unattended for hours, days, or weeks at a time (e.g., in a marina, at dock, at a mooring ball, at anchor, etc.), and are often unable to monitor the condition of the vessel while it is unattended. Additionally, when a user is onboard the vessel, but not operating the vessel (e.g., while below in a cabin of the vessel, while sleeping, etc.), the user may not be able to monitor the condition of the vessel. While some vessels may be equipped with sensors that can be used to avoid collisions with objects while the vessel is being operated (e.g., manually and/or in an autonomous or semi-autonomous mode), such sensors and/or systems can be resource intensive and/or can be restricted from operating while a user is not present to monitor and/or consent to autonomous navigation.

In some embodiments, mechanisms described herein can utilize a perception system of a vessel (e.g., a vision system that utilizes depth cameras) to monitor an environment of the vessel for an increased risk of collision (e.g., due to an object in the environment drifting toward the vessel and/or the vessel becoming unmoored and drifting). In some embodiments, mechanisms described herein can capture information about the environment of the vessel using sensors that monitor the environment at a reduced rate (e.g., to conserve resources). In some embodiments, if mechanisms described herein determine that there is an increased risk of collision, mechanisms described herein can generate an alert and/or can present an alert to one or more local or remote users that can address the collision risk.

Figure 1:
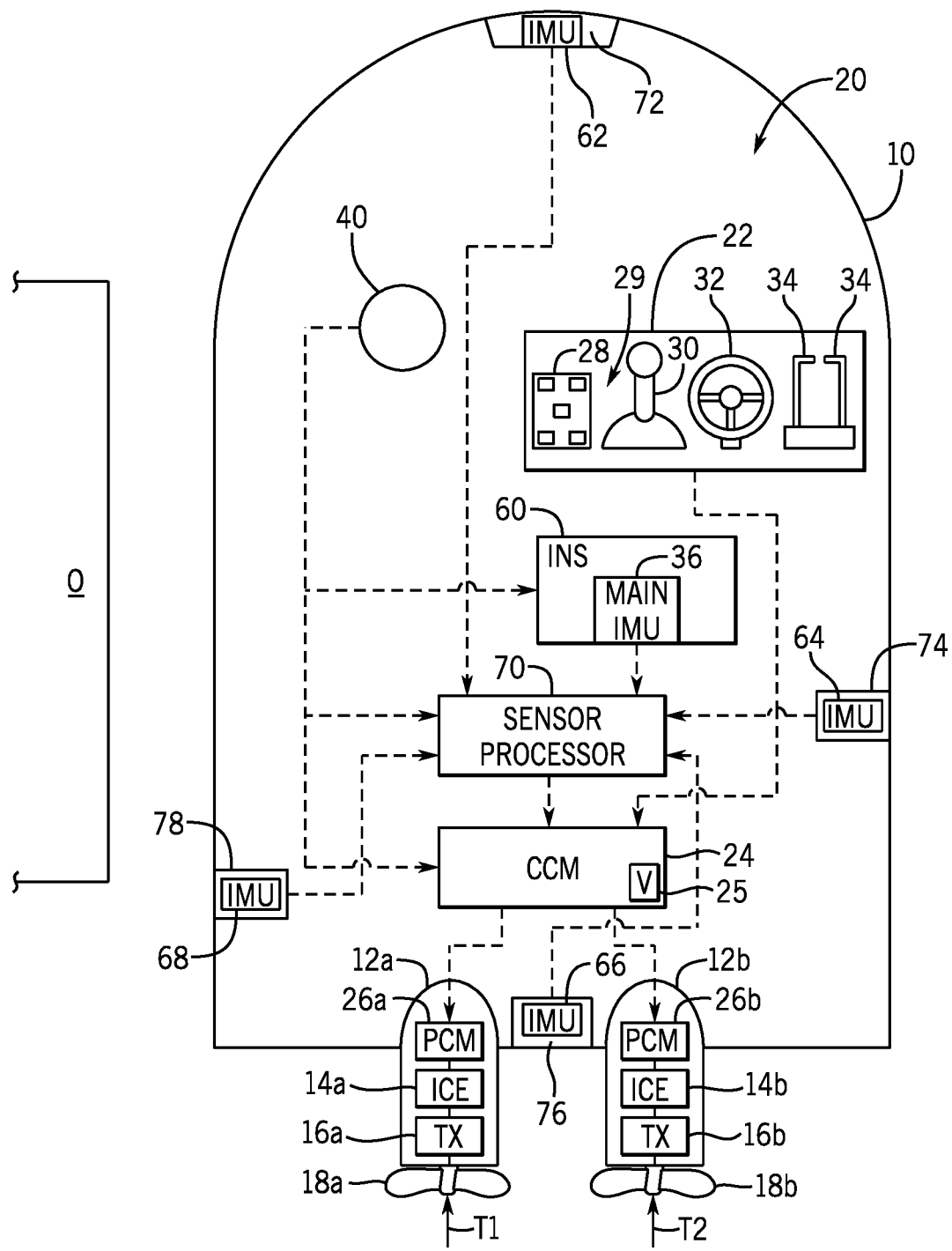
FIG. 1 shows an example of a schematic representation of a propulsion system on a marine vessel in accordance with some embodiments of the disclosed subject matter.

FIG. 1 shows an example of a schematic representation of a propulsion system on a marine vessel in accordance with some embodiments of the disclosed subject matter. FIG. 1 shows a marine vessel 10 equipped with a propulsion system 20 on marine vessel 10 configured in accordance with some embodiments of the disclosed subject matter. In some embodiments, propulsion system 20 can be configured to operate, for example, in a joysticking mode in which a joystick is operated by a user to control vessel movement within an x/y plane, among other modes (e.g., as described hereinbelow). In some embodiments, propulsion system 20 can include first and second propulsion devices 12a, 12b that produce first and second thrusts T1, T2 to propel the vessel 10. First and second propulsion devices 12a, 12b are illustrated as outboard motors, but can alternatively be inboard motors, stern drives, jet drives, pod drives, any other suitable propulsion device, or combinations thereof. Each propulsion device can be provided with an engine 14a, 14b operatively connected to a transmission 16a, 16b, in turn, operatively connected to a propeller 18a, 18b.

In some embodiments, vessel 10 can also house various control elements that comprise part of the marine propulsion system 20. For example, marine propulsion system 20 can comprise an operation console 22 in signal communication, for example via a controller area network (CAN) bus (e.g., as described in U.S. Pat. No. 6,273,771), with a controller 24, such as a command control module (CCM), and with propulsion control modules (PCM) 26a, 26b associated with the respective propulsion devices 12a, 12b. Each of controller 24 and the PCMs 26a, 26b can include memory and a programmable processor. Each control module 24, 26a, 26b can include one or more processors communicatively connected to a respective storage system comprising a computer-readable medium that includes volatile and/or nonvolatile memory upon which computer-readable code and data can be stored. Additionally or alternatively, in some embodiments, a processor(s) of one or more of control modules 24, 26a, 26b can be communicatively connected to a shared storage system comprising a computer-readable medium that includes volatile and/or nonvolatile memory upon which computer-readable code and data can be stored. In some embodiments, each processor can access computer-readable code and, upon executing the code, carry out one or more functions, such as collision risk detection when secured, as described in detail below.

In some embodiments, operation console 22 can include any suitable number of user input devices, such as, a keypad 28, a joystick 30, a steering wheel 32, and/or one or more throttle/shift levers 34. Each of these devices can be configured to input commands to controller 24, which can, in turn, communicate control instructions to first and second propulsion devices 12a, 12b by communicating with the PCMs 26a, 26b. In some embodiments, steering wheel 32 and throttle/shift lever(s) 34 can function in a conventional manner, such that rotation of steering wheel 32, for example, activates a transducer that provides a signal to controller 24 regarding a desired direction of the vessel 10. Controller 24 can, in turn, send signals to PCMs 26a, 26b (and/or thrust vector module(s) (TVMs), or additional modules if provided), which in turn can activate steering actuators to achieve desired orientations of the propulsion devices 12a, 12b. In some embodiments, propulsion devices 12a, 12b can be independently steerable about a respective steering axis. Throttle/shift lever(s) 34 can send signals to controller 24 regarding the desired gear (forward, reverse, or neutral) of transmissions 16a, 16b and desired rotational speed of engines 14a, 14b of propulsion devices 12a, 12b. Controller 24 can, in turn, send signals to PCMs 26a, 26b, which in turn activate electromechanical actuators in transmissions 16a, 16b and engines 14a, 14b for shift and throttle, respectively. A manually operable input device, such as joystick 30, can also be used to provide signals to controller 24. In some embodiments, joystick 30 can be used to allow an operator of vessel 10 to manually maneuver vessel 10, such as to achieve lateral translation or rotation of vessel 10.

In some embodiments, propulsion system 20 can also include one or more depth sensors 72, 74, 76, and 78. In some embodiments, depth sensors 72-78 can form a portion of a perception system associated with vessel 10 (note that a perception system is sometimes referred to as a vision system, and may be configured to use visible light sensing modes, and/or other sensing modes, such as sound-based sensing, radio-based sensing, infrared-based sensing, etc.). Although a limited number of depth sensors are shown (e.g., one perpendicular to each of the bow, stern, and port and starboard sides the vessel 10), fewer or more sensors can be provided at each location and/or provided at other locations, such as on a hardtop of the vessel 10. In some embodiments, depth sensors 72-78 can be used to determine a three-dimensional location of an object and/or other feature of an environment (e.g., a water surface) that is within a field of view of the depth sensor with respect to the location of the depth sensor (e.g., distance to various points on an object and a direction associated with each of the various points). For example, depth sensors 72-78 can be implemented using one or more of depth cameras (e.g., implemented using stereoscopic imaging techniques, structured light imaging techniques, continuous-wave time-of-flight imaging techniques, direct time-of-flight imaging techniques, etc.), three-dimensional laser range finders (e.g., implemented using light detection and ranging (lidar) techniques), radars, sonars, and/or other devices individually capable of determining both the distance and direction to points on an object and/or other feature relatively accurately (e.g., on the order of centimeters at relatively close ranges, such as up to several meters, and on the order of a meter at relatively distant ranges, such as upward of 50 m, with accuracy decreasing with distance)), e.g., the relative position of various points on an object O (such as a dock, a seawall, a slip, another vessel, a person, a portion of a bridge, a portion of a dam, a relatively large rock, a tree, etc.) with respect to each sensor 72-78 having a field of view that includes object O. In some embodiments, a 3D location of object O and/or various points on object O with respect to vessel 10 can be determined (e.g., by a sensor processor 70) using the location of object O and/or various points on object O determined by one or more of depth sensors 72-78. In some embodiments, a calibration process can be performed to determine a set of transforms that can be used to convert a location from a local coordinate system used by a particular depth sensor to the corresponding location in a global coordinate system used by vessel 10 (e.g., used to perform autonomous navigation processes, such as automatically guiding vessel 10 during docking).

In some embodiments, a global coordinate system (sometimes referred to as global coordinates or world coordinates) can be defined relative to a particular point on vessel 10. For example, locations of points in an environment of vessel 10 can be defined based on the distance from a predetermined point, such as center of gravity (COG) or center of rotation (COR) of vessel 10. In some embodiments, the global coordinate system can use any suitable type of coordinate system, such as a 3D Cartesian coordinate system, a spherical coordinate system, a cylindrical coordinate system, etc.

In some embodiments, sensors 72-78 can determine and/or provide information regarding a location of an object in camera coordinates and using any suitable format (e.g., providing information using a depth image(s) such as an RGBD image, or using a point cloud in any suitable file format). Additionally or alternatively, in some embodiments, sensors 72-78 can determine and/or provide information regarding a location of an object in global coordinates (e.g., using a transform between camera coordinates and global coordinates identified during a calibration procedure) and using any suitable format (e.g., providing information using a depth image(s) such as an RGBD image, or using a point cloud in any suitable file format). In some embodiments, sensors 72-78 can provide position information for various points within that sensors FOV to one or more controllers, such as to sensor processor 70 and/or controller 24 via any suitable communication network, such as by way of a dedicated bus connecting the sensors to a controller, a CAN bus, or wireless network link(s), as described below. In some embodiments, given the large amount of depth data produced by depth sensors 72-78, the connection between sensors 72-78 and the sensor processor 70 can be via a dedicated bus or network connection. Such a dedicated bus or network connection can be separate from the vessel network (e.g., including a CAN bus) in order to facilitate transmission of a large amount of depth measurement data (and, in some embodiments, IMU data) to sensor processor 70. Such massive data transmission may not be possible on a typical vessel network, such as a CAN bus or wireless network where multiple devices are communicating. In some embodiments, sensor processor 70 can be configured to communicate filtered data on the vessel network, such as a CAN bus or wireless network. Additionally or alternatively, a dedicated communication link can be provided between sensor processor 70 and a propulsion controller, such as central controller 24.

In some embodiments, sensors 72-78 can include different types of sensors (e.g., depending on the distance between vessel 10 and an object, such as object O). For example, radar sensors can be used to detect objects at further distances, and cameras, sonic sensors, and/or lidar can be used to for objects at closer distances. Note that depth camera sensors can be used, alone or in combination with any of the sensors described above, for example, to provide object location information to controller 24. Sensors 72-78 can be placed at positions on vessel 10 so that the sensor is at a height and facing a direction suitable to detect objects that vessel 10 is likely to encounter. Additionally, sensors 72-78 (and/or additional sensors) can be placed to have at least partially overlapping fields of view. Note that optimal sensor positions can vary depending on vessel size and configuration.

In FIG. 1, the depth sensors shown are positioned to observe multiple regions around vessel 10, including the front, sides, and stern of vessel 10, and include a front-facing sensor 72, a starboard-facing sensor 74, a rear-facing sensor 76, and a port-facing sensor 78. In some embodiments, one or more depth sensors can be placed on a hard top of marine vessel 10 and arranged such that the fields of view of the one or more depth sensors, combined, cover the entire 360° area surrounding vessel 10 (although there may be blind spots relatively close to vessel 10 (e.g., where the hull obstructs the field of view). Note also that the relevant controller, such as sensor processor 70, can selectively operate any one or more of a plurality of sensors (e.g., including depth cameras, radars, lidars, ultrasonics, or any other suitable sensor technology) to sense the location of objects in an environment of vessel 10. Note that the global coordinate system can be independent and distinct from a geographical coordinate system of latitude and longitude often used to designate locations on Earth.

In some embodiments, sensor processor 70 can integrate sensor data provided from one or more types of sensor into one or more models of an environment of vessel 10, objects within the environment, and/or vessel 10 itself. In such embodiments, the model(s) can be in any suitable format, such as one or more point clouds, one or more maps, and/or one or more occupancy grids integrating location information from multiple sensors. As described above, the location data from different sensors can be translated into a common reference frame (e.g., defined by the global coordinate system).

Autonomous and/or advanced operator assistance (sometimes referred to as semi-autonomous) controls for improved vessel handling qualities generally requires a relatively accurate ability to identify objects in an environment of vessel 10, often using multiple depth sensors mounted on vessel 10. In general, such depth sensors can be positioned to detect the objects in the marine environment surrounding marine vessel 10, such as a dock, a swimmer, or other obstruction in the current path and/or other potential paths of vessel 10. Each sensor can provide location information of features within its field of view relative to its own frame of reference (e.g., in the camera coordinate system associated with that sensor) and/or in a common frame of reference (e.g., in the global coordinate system). For example, the location information can be transformed from the respective camera coordinates at the camera and/or at a controller (e.g., sensor processor 70) using one or more transforms derived during a calibration procedure. Depending on the type of sensor(s), the application of use, boat size, hull shape, etc., multiple sensor types and sensor locations may be required to provide adequate sensing around the marine vessel for operation in all marine environments. To create a cohesive dataset that can be used for purposes of vessel control and vessel navigation, including autonomous vessel navigation and automatic maneuver-limiting control (e.g., velocity limiting for object avoidance, maintenance of a buffer zone, etc.), information from multiple sources (e.g., multiple depth sensors, multiple types of depth sensors, depth sensors, etc.), can be translated to a common reference frame. To accurately translate the information to the common reference frame typically requires precise knowledge of the posture (e.g., including 3D location, installation attitude, and/or orientation) of each sensor relative to the common reference frame such that the information received from each sensor can be translated appropriately. Regardless of what type of model(s) is being generated, the relevant sensor installation posture of each sensor on the marine vessel must be known so that the location information from each respective sensor can be properly interpreted for navigation purposes. Note that the installation posture of each sensor can be calculated or otherwise determined explicitly, however such information is difficult to determine with sufficient accuracy. Alternatively, the installation posture of each sensor can be implicit in the transforms determined during a calibration procedure (e.g., transforms that are optimized using machine learning techniques may not require explicit knowledge of the location of the sensors). In some embodiments, a calibration procedure can begin with an initial estimate of camera poses (e.g., based on measurement and/or a CAD model), and the calibration procedure can include refining the initial estimate (e.g., via an optimization algorithm).

In some embodiments, vessel 10 can have a main inertial measurement unit (IMU) installed at a known location on the marine vessel. Referencing the example in FIG. 1, main IMU 36 can be part of an inertial navigation system (INS) such as including one or more micro-electro-mechanical systems (MEMS). For example, INS 60 can include a MEMS angular rate sensor, such as a rate gyro, a MEMS accelerometer, and a magnetometer. Such INS systems are well known in the relevant art. Additionally or alternatively, in some embodiments, motion and angular position (including pitch, roll, and yaw) can be sensed by a differently configured INS 60, or by an attitude heading reference system (AHRS) that provides 3D orientation of vessel 10 by integrating gyroscopic measurements, accelerometer data, and magnetometer data. In some embodiments, INS 60 can receive orientation information from main IMU 36 and can also receive information from a GPS receiver 40 comprising part of a satellite-based radio navigation system, such as the global positioning system (GPS). GPS receiver 40 can be located at a pre-selected fixed position on vessel 10, which provides information related to a position of vessel 10 with respect to a planetary frame of reference (e.g., latitude, longitude, and height with respect to sea level). In some embodiments, main IMU 36 can also be located at a known and fixed position with respect to the center of rotation (COR) and/or center of gravity (COG) of vessel 10 (e.g., a COG when the vessel is empty).

In some embodiments, IMU data from each sensor IMU 62-68 and/or main IMU 36 can be provided to sensor processor 70 and/or to another controller (e.g., CCM 24, INS 60, etc.). For example, the IMU data from each sensor IMU 62-68 can be transmitted along with the feature location information from the respective depth sensor 72-78. Additionally or alternatively, in some embodiments, each sensor IMU 62-68 can have an integrated microprocessor configured to process the respective sensor IMU data and compare the sensor IMU data to main IMU data and determine whether the sensor IMU data is inconsistent with the main IMU data based on the relative location of the sensor IMU with respect to main IMU 36. In some embodiments, as shown in FIG. 1, object location data and/or IMU data can be communicated to sensor processor 70 (and/or any other suitable controller), which can be via any suitable wired or wireless communication technique(s), such as via a dedicated communication bus, wireless transmission protocols (e.g. Bluetooth, Bluetooth Low Energy, ZigBee, etc.), a CAN bus comprising part of the vessel network, etc. Note that the dashed lines in FIG. 1 are meant to show only that the various control elements are capable of communicating with one another, and do not necessarily represent actual wiring connections between the control elements, nor do they represent the only possible paths of communication between the elements.

In some embodiments, some sensor processing functions can be performed by a separate computing device. For example, sensor processor 70 can communicate processed sensor data to central controller 24, which can utilize the processed data for navigation functions and/or other vessel control functions. In some embodiments, sensor processor 70 can be a dedicated, special-purpose computing system configured to process object location data and/or IMU data from depth sensors 72-78, sensor IMUs 62-68, and/or main IMU 36. As described below, in some embodiments, sensor processor 70 can be associated with its own storage system comprising memory and its own processing system that executes programs and accesses data stored in the memory of sensor processor 70. Additionally or alternatively, in some embodiments, one or more functions described as being performed by sensor processor 70 can be incorporated in a multi-purpose controller, such as sensor processor software stored and executed within controller 24. For example, in some embodiments, controller 24 can control marine vessel navigation, such as autonomous point-to-point navigation, automatic docking, or other advanced operator assistance programs. In some embodiments, central controller 24 can also perform one or more sensor processing functions. Additionally or alternatively, in some embodiments, functions described herein as comprising part of the sensor processor functions can be distributed across two or more processing devices. For example, each sensor 72-78 can include one or more processors that are configured to perform certain functions (e.g., segmenting image data to classify one or more objects in the image, generate one or more RGBD images, generate one or more 3D depth maps, generate a point cloud corresponding to the 3D depth map, project points into a global coordinate system). As another example, each IMU 62-68 can include (or otherwise be associated with) one or more processors that are configured to perform calculations to interpret measured IMU data (such as to determine an attitude estimate for the respective IMU, to determine whether the sensor IMU data is inconsistent with main IMU data, etc.) and provide the interpreted IMU data to one or more other processing devices or controllers for execution of subsequent processing steps.

Autonomous and semi-autonomous vessel control systems for operating in marine environments can present challenges that are particular to such applications where marine vessels have additional degrees of freedom of movement compared to conventional automotive applications—for example, marine vessels can be configured to effectuate movements in only lateral and yaw directions without any forward or reverse movement (e.g., in a joysticking mode). Additionally, marine environments pose unique external environmental factors acting on the marine vessel, such as current, wind, waves, etc., that are not present in automotive applications (or can be essentially ignored, in the case of wind). Additionally, due to such external environmental factors, it is possible for a marine vessel that is unoccupied, or occupied but not currently being operated (e.g., secured in some fashion, such as via mooring or an anchor), to be at risk for collisions with other vessels and/or other objects in the marine environment that may be avoidable if sufficient warning is provided to an owner or other user of the marine vessel.

In some embodiments, as described above, depth sensors 72-78 can be used to generate data that can be used for autonomous navigation (e.g., path planning, collision avoidance, station keeping, etc.) while marine vessel 10 is being operated. In some embodiments, sensor processor 70 can be programmed (and/or otherwise configured) to automatically perform a process for detecting an elevated collision risk when vessel 10 is secured (e.g., via an anchor, mooring ball, slip, dock, etc.). In some embodiments, sensor processor 70 (and/or any other suitable processor(s)) can analyze depth information about a local area near vessel 10 after vessel 10 has been secured, and determine whether a risk of collision has significantly increased (e.g., due to one or more lines securing vessel 10 breaking or otherwise detaching from the secure location, due to another vessel becoming unmoored and adrift, due to another large object adrift in the environment, etc.).

Figure 2:
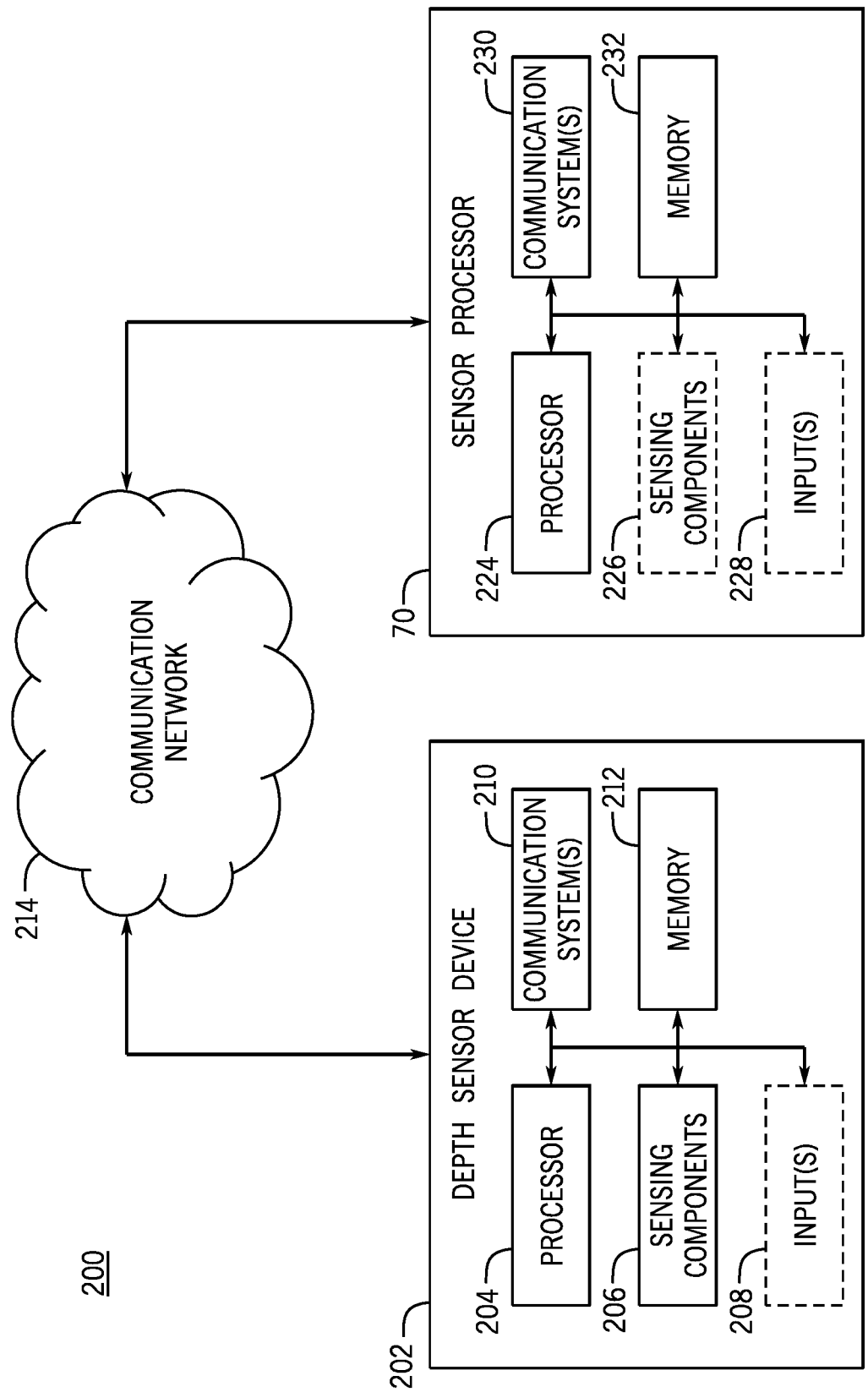
FIG. 2 shows an example of hardware that can be used to implement a sensor device and sensor processor in accordance with some embodiments of the disclosed subject matter.

FIG. 2 shows an example of hardware 200 that can be used to implement a depth sensor device 202 and sensor processor 70 in accordance with some embodiments of the disclosed subject matter.

As shown in FIG. 2, in some embodiments, depth sensor device 202 can include a processor 204, sensing components 206, one or more inputs 208, one or more communication systems 210, and/or memory 212. In some embodiments, processor 204 can be any suitable hardware processor or combination of processors, such as a central processing unit (CPU), an accelerated processing unit (APU), a graphics processing unit (GPU), a field programmable gate array (FPGA), an application specific integrated circuit (ASIC), etc.

In some embodiments, sensing components can include components that are used to determine a three-dimensional location of an object and/or other feature of an environment (e.g., a water surface) that is within a field of view of depth sensor device 202. In some embodiments, depth sensor device 202 can include components used to implement one or more of depth sensors 72-78.

For example, depth sensor device 202 can be implemented as one or more cameras that include components that facilitate three-dimensional imaging of a region of an environment, such as a stereoscopic camera, a structured light camera, a continuous-wave time-of-flight camera, a direct time-of-flight camera, etc. As another example, depth sensor device 202 can be implemented as one or more lidar devices (e.g., a scanning lidar, a lidar including a 2D array sensor, etc.) that include components that facilitate three-dimensional characterization of a region of an environment. As yet another example, depth sensor device 202 can be implemented as one or more sound-based devices (e.g., one or more sonar systems, etc.) that include components that facilitate three-dimensional characterization of a region of an environment. As still another example, depth sensor device 202 can be implemented as one or more radio wave-based devices (e.g., one or more radar systems, etc.) that include components that facilitate three-dimensional characterization of a region of an environment.

In some embodiments, inputs 208 can include any suitable input devices and/or sensors that can be used to receive user input, such as a keyboard, a mouse, a touchscreen, a touchpad, a microphone, a camera, etc. In some embodiments, depth sensor device 202 can omit inputs (e.g., where depth sensor device 202 is an embedded device, or where depth sensor device 202 is not configured for direct end user operation).

In some embodiments, communications systems 210 can include any suitable hardware, firmware, and/or software for communicating information over a communication network 214 and/or any other suitable communication networks. For example, communications systems 210 can include one or more transceivers, one or more communication chips and/or chip sets, etc., that can be used to establish a wired and/or wireless communication link. In a more particular example, communications systems 210 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 212 can include any suitable storage device or devices that can be used to store instructions, values, etc., that can be used, for example, by processor 204 to generate location information of a portion of the environment that characterizes the portion of the environment in three-dimensions, to identify and/or classify one or more objects and/or other features in a scene based on the location information and/or image information, to communicate with sensor processor 70 via communications system(s) 210, etc. Memory 212 can include any suitable volatile memory, non-volatile memory, storage, or any suitable combination thereof. For example, memory 212 can include random access memory (RAM), read-only memory (ROM), electronically erasable programmable read-only memory (EEPROM), one or more flash drives, one or more hard disks, one or more solid state drives, one or more optical drives, etc. In some embodiments, memory 212 can have encoded thereon a computer program for controlling operation of depth sensor device 202. In such embodiments, processor 204 can execute at least a portion of the computer program to generate location information, to identify and/or classify one or more objects and/or other features in a scene based on the location information and/or image information, to transmit information to sensor processor 70, to execute at least a portion of a process for detecting elevated collision risk to a secured marine vessel using a vision system of the marine vessel, and/or a process for presenting a collision alert for a secured vessel, such as processes described below in connection with FIGS. 3 and 4, etc.

In some embodiments, depth sensor device 202 can include any suitable display device(s) (not shown), such as a computer monitor, a touchscreen, a television, etc.

In some embodiments, communication network 214 can be any suitable communication network or combination of communication networks. For example, communication network 214 can include a Wi-Fi network (which can include one or more wireless routers, one or more switches, and the like), a peer-to-peer network (e.g., a Bluetooth network), a cellular network (e.g., a 3G network, a 4G network, a 5G network, etc., complying with any suitable standard(s), such as CDMA, GSM, LTE, LTE Advanced, 5G NR, etc.), a wired network, etc. In some embodiments, communication network 214 can include one or more portions of a control area network (CAN), a local area network (LAN), a wide area network (WAN), a public network (e.g., the Internet, which may be part of a WAN and/or LAN), any other suitable type of network, or any suitable combination of networks. Communications links shown in FIG. 2 can each be any suitable communications link or combination of communications links, such as wired links, fiber optic links, Wi-Fi links, Bluetooth links, cellular links, etc.

In some embodiments, sensor processor 70 can include a processor 224, a display 226, one or more inputs 228, one or more communications systems 230, and/or memory 232. In some embodiments, processor 224 can be any suitable hardware processor or combination of processors, such as a CPU, an APU, a GPU, an FPGA, an ASIC, etc. In some embodiments, display 226 can include any suitable display devices, such as a computer monitor, a touchscreen, a television, etc. In some embodiments, inputs 228 can include any suitable input devices and/or sensors that can be used to receive user input, such as a keyboard, a mouse, a touchscreen, a microphone, etc. In some embodiments, sensor processor 70 can omit inputs (e.g., where sensor processor 70 is an embedded device that is not configured for direct user interaction). For example, sensor processor 70 can provide results of an analysis to CCM 24, and CCM 24 can use the results to assist with autonomous control and/or advanced operator assistance control.

Additionally, in some embodiments, vessel 10 can include one or more additional outputs (e.g., indicator lights, speakers, displays, etc.), which can be included in sensor processor 70, or which may be integrated into another device (e.g., an MFD, an entertainment and/or voice communication system, etc.).

In some embodiments, communications systems 230 can include any suitable hardware, firmware, and/or software for communicating information over communication network 214 and/or any other suitable communication networks. For example, communications systems 230 can include one or more transceivers, one or more communication chips and/or chip sets, etc., that can be used to establish a wired and/or wireless communication link. In a more particular example, communications systems 230 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 232 can include any suitable storage device or devices that can be used to store instructions, values, etc., that can be used, for example, by processor 224 to analyze object location information received from depth sensor device 202 (and/or any other suitable depth sensor device), to identify and/or classify one or more objects and/or other features in a scene based on the location information and/or image information, to communicate with depth sensor device 202 via communications system(s) 230, etc. Memory 232 can include any suitable volatile memory, non-volatile memory, storage, or any suitable combination thereof. For example, memory 232 can include RAM, ROM, EEPROM, one or more flash drives, one or more hard disks, one or more solid state drives, one or more optical drives, and the like. In some embodiments, memory 232 can have encoded thereon a computer program for controlling operation of sensor processor 70. In such embodiments, processor 224 can execute at least a portion of the computer program to analyze object location information, to identify and/or classify one or more objects and/or other features in a scene based on the object location information and/or image information, to receive information from depth sensor device 202, to execute at least a portion of a process for detecting elevated collision risk to a secured marine vessel using a vision system of the marine vessel, and/or a process for presenting a collision alert for a secured vessel, such as processes described below in connection with FIGS. 3 and 4, etc.

Figure 3:
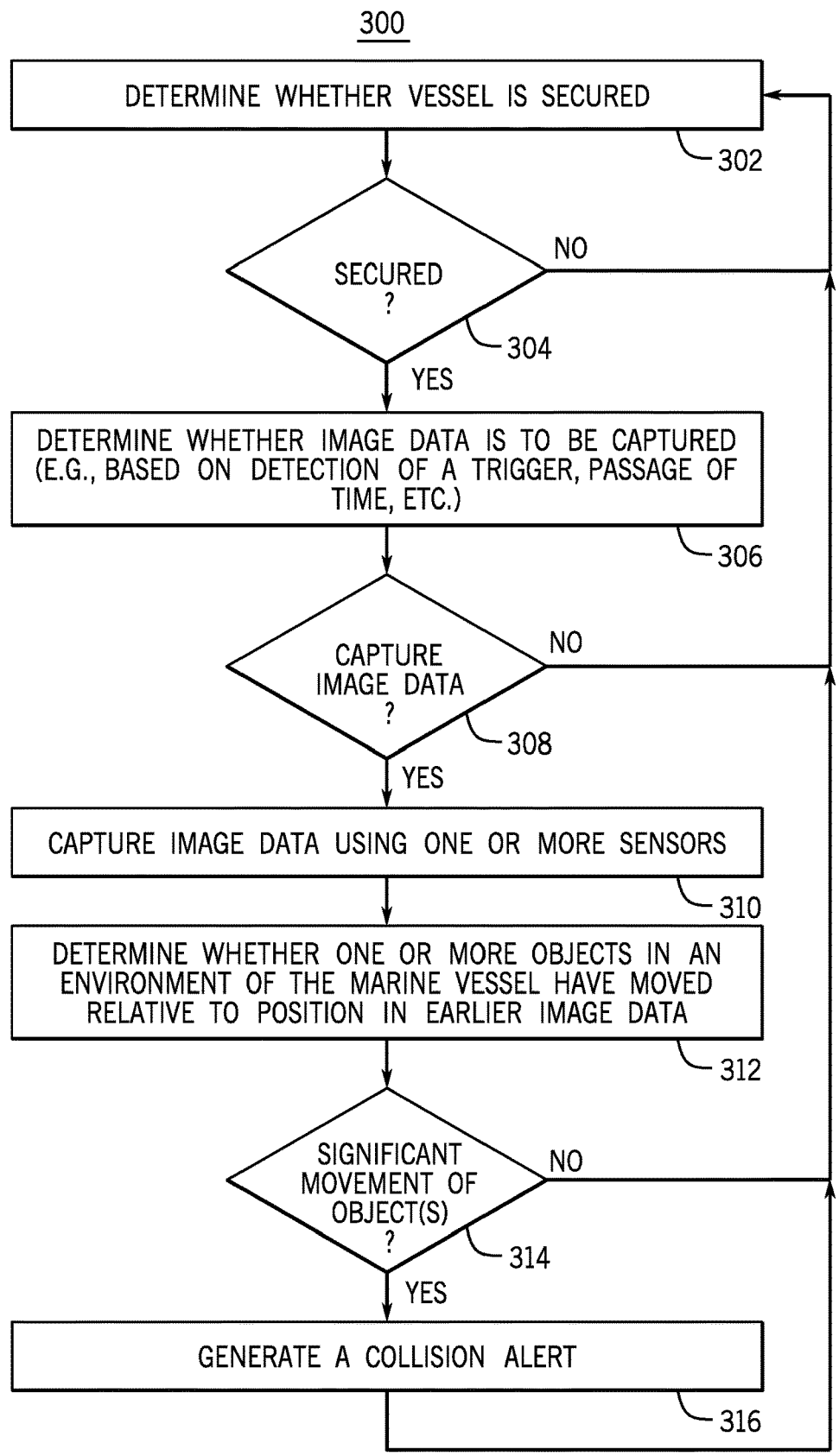
FIG. 3 shows an example of a process for detecting elevated collision risk to a secured marine vessel using a vision system of the marine vessel in accordance with some embodiments of the disclosed subject matter.

FIG. 3 shows an example of a process 300 for detecting elevated collision risk to a secured marine vessel using a vision system of the marine vessel in accordance with some embodiments of the disclosed subject matter.

At 302, process 300 can determine whether a marine vessel to be monitored for collision risk (e.g., a vessel executing process 300, such as vessel 10) is secured. In some embodiments, process 300 can use any suitable technique or combination of techniques to determine whether the vessel is secured. A vessel can be secured using a variety of techniques, and can be secured in various ways. For example, a vessel can be secured if the vessel is secured to a dock or mooring ball (e.g., the vessel can be docked or moored). As another example, a vessel can be secured if an anchor of the vessel has been deployed (e.g., the vessel can be anchored). As yet another example, a vessel can be secured if the vessel is beached. As still another example, a vessel can be secured if it is tied up to any suitable structure. In some embodiments, a vessel that is not being operated can be in a secured state in which movement of the vessel is constrained, or in an unsecured state in which movement of the vessel is not constrained (e.g., the vessel can be adrift). Note that this can be distinguished from when the vessel is being operated and it may be placed into a state in which the vessel autonomously maintains a relatively consistent location (e.g., a station keeping mode). In such a state, propulsion devices and/or other devices of the vessel can be operated (e.g., by a user, by a controller, etc.) to maintain a relatively fixed position.

In some embodiments, process 300 can determine that the vessel is secured based on input from a user (e.g., via a hardware-based user interface element, via a software-based user interface element presented via a touchscreen such as an MFD, via a mobile device such as a smartphone or tablet computer, etc.). For example, input can be received (e.g., via a device onboard the vessel, via a mobile device associated with a user of the vessel such as a smartphone that has been paired with the vessel) indicating that the vessel is to enter a docked or moored state. As another example, input can be received indicating that the vessel has been docked, moored, or otherwise secured. As yet another example, input can be received (e.g., via a device onboard the vessel, via a mobile device associated with a user of the vessel such as a smartphone that has been paired with the vessel) indicating that the vessel is to enter a secured state (e.g., in which the vessel is configured to lock out helm controls until unlocked via a particular device is detected and/or input is received). In some embodiments, a user can provide input indicating how the vessel is secured (e.g., to a mooring ball, to a dock, via an anchor, etc.).

Additionally or alternatively, in some embodiments, process 300 can determine that whether the vessel is secured based on data generated by one or more depth sensor devices, and/or other input devices (e.g., a non-depth sensing digital imaging device, a GPS receiver, one or more IMUs, a motor and/or sensor associated with deploying an anchor such as via a windlass, etc.), when the vessel is not being actively operated (e.g., by a user and/or by a controller) and/or has likely been secured (e.g., by deploying an anchor via an automated or manual windlass associated with a sensor in communication with a controller).

For example, when a propulsion system 20 is not being actively operated (e.g., an ignition switch is in a position other than "on" or "start", the motor(s) is off or in a generator mode, etc.), process 300 can determine that the vessel is maintaining a relatively stable position (e.g., via a geofence, using IMUs to estimate lateral motion, etc.). In such an example, if the vessel is maintaining a relatively stable position (e.g., not moving more than a predetermined amount, not moving out of a predetermined area around a mooring or anchoring point, etc.). In a more particular example, process 300 can determine that the vessel is likely docked if the vessel has not moved more than 0.5 meters (m), 1 m, etc., in any direction, as more movement may indicate that the vessel has become at least partially unsecured. In such an example, a docked vessel can be expected to be secured at multiple points to reduce a likelihood that the vessel will move (e.g., due to wind, waves, current) and collide with the dock and/or other objects and sustain damage As another more particular example, process 300 can determine that the vessel is moored (e.g., at a mooring ball) if an anchor point(s) used to secure the vessel to a mooring point (e.g., a mooring ball) has not moved outside of a predetermined area (e.g., a circle centered on the mooring ball with a radius of 2 m, 3 m, 4 m, 5 m, etc., for example, based on a length of a line used to secure the vessel to the mooring ball and/or a height of the tides) around the mooring ball, and/or if the heading of the vessel remains within a predetermined range of the mooring ball (e.g., within a few degrees, such as +5°, +10°, etc.). In such an example, the vessel can be expected to rotate freely around the mooring point, and the heading of the vessel can generally be expected to remain relatively stable with respect to the mooring point (e.g., the bow can generally be expected to point toward the mooring point as the vessel shifts around the mooring point due to wind, waves, and/or current). As yet another more particular example, process 300 can determine that the vessel is likely anchored (e.g., at a mooring ball) if an anchor point(s) that secures the vessel to an anchor(s) has not moved outside of a predetermined area (e.g., a circle centered on the anchor location with a radius a multiple of the water depth, such as seven times the water depth for some conventional anchors) around the anchor location, and/or if the heading of the vessel remains within a predetermined range of the anchor location (e.g., within a few degrees, such as +5°, +10°, etc.). In such an example, the vessel can be expected to rotate freely around the anchor, and the heading of the vessel can generally be expected to remain relatively stable with respect to the anchor.

As another example, when a propulsion system 20 is not being actively operated, process 300 can determine that the vessel is secured based on a consistent presence of a mooring structure (e.g., a dock, a slip, a mooring ball or buoy, etc.) in a FOV of one or more depth sensors (or other type of imaging sensor) over a predetermined period of time. In such an example, if a mooring ball or dock is consistently observed while the vessel is not being operated (e.g., the mooring structure is present in the same relative location with respect to the vessel over a predetermined period of time), process 300 can determine that the vessel is likely secured to the mooring structure. In a more particular example, if a dock or mooring ball is consistently observed (e.g., in approximately the same relative location with respect to the vessel) while the vessel is not being operated for a predetermined amount of time (e.g., 5 minutes, 15 minutes, etc.). Additionally or alternatively, if a dock or mooring ball is consistently observed while the vessel is not being operated for a predetermined amount of time (e.g., 5 minutes, 15 minutes, etc.), and an indication has been received that an operator has left the vessel (e.g., a mobile fob or mobile device associated with the operator is no longer in proximity of the vessel, user input has been received to engage a theft deterrence mode, user input has been received indicating that the vessel is unoccupied, etc.). In such an example, the period of time can be reduced (e.g., from 15 minutes to 5 minutes, from 5 to 2 minutes, etc.).

In some embodiments, process 300 can use an occupancy grid (or other suitable model of the environment) to determine whether the vessel is secured. For example, process 300 can determine a relative position of the vessel and a mooring structure(s) using the occupancy grid (e.g., a cell of the occupancy grid in which a mooring ball is located can be associated with an indication that a mooring ball is located in that location, a cell of the occupancy grid in which a portion of a dock is located can be associated with an indication that a dock is located in that location, etc.). In such an example, of the vessel is secured, the relative position of the vessel and the mooring structure(s) to which the vessel is secured can be expected to be relatively consistent (e.g., a mooring ball can be expected to remain in front of the bow of the vessel, a dock can be expected to remain on a port or starboard side of the vessel, etc.). If process 300 determines that the mooring structure has maintained a relatively consistent position with respect to the vessel based on an occupancy grid (or other model), process 300 can determine that the vessel is secured.

If process 300 determines that the vessel has not been secured ("NO" at 304), process 300 can return to 302 (e.g., to determine whether a user has acted to change the vessel from secured to un-secured). Otherwise, if process 300 determines that the vessel has been secured ("YES" at 304), process 300 can move to 306.

At 306, process 300 can determine whether image data is to be captured based on any suitable factors, and/or any suitable techniques. In some embodiments, while the vessel is being operated, image data (and/or any other suitable data) can be captured relatively frequently by depth sensors (e.g., depth sensors 72-78), which can be used to facilitate autonomous navigation processes and/or other suitable advanced operator assistance processes. For example, while the vessel is being operated image data (and/or any other suitable data) can be captured by each depth sensor at least once per second, and typically is captured multiple times per second (e.g., at a rate upwards of twenty frames per second).

In some embodiments, process 300 can capture image data (and/or any other suitable data) less frequently when the vessel is not being operated and/or when the vessel is secured. For example, process 300 can cause image data (and/or any other suitable data) to be captured at a reduced rate, which can reduce an amount of power that is consumed by depth sensors 72-78 and/or other associated devices.

In some embodiments, a rate at which process 300 captures image data after the vessel has been secured ("YES" at 304) can be based on any suitable factor or combination of factors. For example, if the vessel is occupied, process 300 can capture image data relatively y less frequently than when the vessel is being operated; such as once per second, multiple times per minute, once per minute, once every five minutes, once every ten minutes, etc.). As another example, if a consistent source of power is available (e.g., shore power, a sufficient supply of solar power, a running generator, a relatively large battery pack, etc.), process 300 can capture image data relatively frequently (though potentially less frequently than when the vessel is being operated). As yet another example, a user can indicate that process 300 is to capture data relatively frequently by providing a suitable user input (e.g., placing the vessel into a particular mode, such as a secure mode, a monitoring mode, etc.). In such an example, a user can choose to use available power to actively monitor the vessel for increased collision risk (e.g., when occupied but not operated, when unoccupied, etc.) for any suitable reason, such as if the vessel is secured in a busy or crowded area, if the vessel is secured in an unfamiliar location and/or to an unfamiliar mooring structure, based on user preference, etc.

As still another example, if the vessel is unoccupied and/or does not have a consistent source of power, process 300 can capture image data relatively infrequently (such as once per hour, once per day, etc.). In some embodiments, as the amount of available power decreases and/or the length of time that the vessel has been secured increases, process 300 can reduce a rate at which images are captured.

In some embodiments, at 306, process 300 can determine a rate at which images are to be captured (e.g., one frames per second, one frame per minute, one frame every five minutes, one frame per hour, one frame per day, etc.) based on one or more factors (e.g., factors described above), and can determine whether a predetermined period of time has elapsed since image data was last captured (e.g., a predetermined period of time based on the rate). In some embodiments, process 300 can capture images at a reduced rate relative to a rate at which image data is captured when the vessel is underway (e.g., while the vessel is being operated, regardless of whether the vessel is currently moving). For example, the reduced rate can be less than half of the rate when underway, less than twenty percent of the rate when underway, less than ten percent of the rate when underway, less than five percent of the rate when underway, less than one percent of the rate when underway, etc.

Additionally or alternatively, in some embodiments, process 300 can determine whether to capture image data based on a detection of a triggering event. For example, in some embodiments, process 300 can determine that a triggering event has occurred if process 300 determines that the vessel has moved more than a predetermined distance and/or has moved out of an area at which the vessel was secured. In a more particular example, process 300 can determine whether the vessel has moved more than a predetermined distance from a location of the vessel at the time the vessel was secured (e.g., a time at which process 300 determined the vessel was secured at 302) and/or out of a predetermined area (e.g., based on a geofence around the location of the vessel when it was secured, based on an estimated lateral movement determined from IMU data, etc.). In such an example, if process 300 determines that the vessel has moved by more than a predetermined amount and/or has moved out of an area at which the vessel was secured, process 300 can cause depth sensors (e.g., depth sensors 72-78) to capture image data (and/or any other suitable data) in response to the vessel moving out of an area at which it was secured. In some embodiments, process 300 can use an indication of how the vessel is secured to determine whether to capture image data in response to movement of the vessel. For example, when the vessel is docked, process 300 can set a relatively small geofence and/or movement threshold (e.g., about 1 m), as the vessel can be expected to remain close to the dock. As another example, when the vessel is moored to a mooring ball, process 300 can set a larger geofence and/or movement threshold (e.g., 2 m, 3 m, 4 m, 5 m, etc., which can be based on a length of a line used to secure the vessel to the mooring ball and/or a height of the tides), as the vessel can be free to pivot around the mooring ball as conditions (e.g., wind, current, etc.) change. As another example, when the vessel is secured using an anchored (e.g., using a temporary anchor), process 300 can set an even larger geofence and/or movement threshold (e.g., a circle centered on the anchor location with a radius a multiple of the water depth, such as seven times the water depth), as the vessel can be free to pivot around the anchor as conditions (e.g., wind, current, etc.).

As another example, in some embodiments, process 300 can determine that a triggering event has occurred if process 300 determines that the vessel is experiencing rough seas. In such an example, process 300 can determine whether the vessel is likely experiencing rough seas based on IMU data or any other suitable data indicating that waves are larger than a predetermined size. Such conditions may result in an increased likelihood of the vessel or another vessel becoming unmoored, and can trigger increased capture of data (e.g., by depth sensors 72-78).

If process 300 determines that capture of image data as part of process 300 is not called for ("NO" at 308), process 300 can return to 302 (e.g., to determine whether a user has acted to change the vessel from secured to un-secured, such as when a user begins operating the vessel). Otherwise, if process 300 determines that capture of image data as part of process 300 is called for ("YES" at 308), process 300 can move to 310.

At 310, process 300 can cause one or more sensors (e.g., depth sensors, such as depth sensors 72-78) to capture image data and/or any other suitable data of an environment of the marine vessel. In some embodiments, process 300 can include capturing image data using any suitable type of camera(s), and/or any suitable number of cameras. For example, as described above, in some embodiments, process 300 can include capturing images with stereoscopic cameras, structured light cameras, continuous-wave time-of-flight cameras, direct time-of-flight cameras, etc. In some embodiments, cameras used to capture image data at 310 can capture information in various portions of the electromagnetic spectrum. For example, cameras used to capture image data at 310 can capture information using light in the visible spectrum (e.g., with wavelengths in a range of about 380 to 700 nanometers (nm)). As another example, cameras used to capture image data at 310 can capture information using light outside the visible spectrum (e.g., in the infrared portion of the spectrum, such as near-infrared, in the ultra-violet portion of the spectrum).

In some embodiments, process 300 can capture 3D information of an environment of a marine vessel with multiple depth sensors having different fields of view, and that use a non-imaging technology. For example, process 300 can capture 3D information of an environment of a marine vessel using lidar. As another example, process 300 can capture 3D information of an environment of a marine vessel using radar. As yet another example, process 300 can capture 3D information of an environment of a marine vessel using sonar.

Additionally or alternatively, in some embodiments, process 300 can include capturing one or more images with a non-depth sensing camera, such as a conventional two-dimensional digital camera (e.g., that outputs RGB images).

In some embodiments, process 300 can use any suitable technique or combination of techniques to locate and/or classify objects in the image data (and/or other data) captured at 310. For example, in some embodiments, process 300 can generate segmentation information based on one of more of the images captured at 310. For example, the segmentation information can include classification information that indicates which of a set of classes different portions of the image are most likely to correspond. In some embodiments, the set of classes can include classes that are relatively likely for the vessel to encounter (e.g., in a marine environment). For example, the set of classes can include one or more classes of bodies of water, such as one or more broad class of water feature (e.g., water surface), and/or multiple more specific classes of water features (e.g., river, lake, sea, ocean, deep water, shallow water, etc.). As another example, the set of classes can include one or more classes of structure, such as one or more broad class of structural feature (e.g., structure), and/or multiple more specific classes of structural features (e.g., dock, bridge, building, sea wall or more specific classes such as concrete sea wall or rock sea wall, etc.). As yet another example, the set of classes can include one or more classes of vessel, such as one or more broad class of vessel feature (e.g., vessel, boat, motor vehicle, etc.), and/or multiple more specific classes of vessel features (e.g., boat, large boat, small boat, personal watercraft or more specific classes such as jet ski, sail boat, human-powered watercraft or more specific classes such as: canoe; kayak; or standup paddle board, etc.). In such an example, the segmentation information can include a class corresponding to features of the vessel associated with the camera(s) that captures the image (e.g., an ego vessel class). As still another example, the set of classes can include one or more classes of vegetation, such as one or more broad class of vegetation feature (e.g., vegetation, etc.), and/or multiple more specific classes of vegetation features (e.g., trees, brush, algae, etc.). As a further example, the set of classes can include one or more classes of animal, such as one or more broad class of animal feature (e.g., animal), and/or multiple more specific classes of vegetation features (e.g., person, dog, marine animal, etc.). As another further example, the set of classes can include one or more classes of navigation aid, such as one or more broad class of navigation aid feature (e.g., navigation aid), and/or multiple more specific classes of navigation aid features (e.g., channel marker, buoy, sign, specific types of signs, etc.). As yet another further example, the set of classes can include one or more classes of open space and/or land, such as one or more broad class of sky feature (e.g., sky) and/or land feature (e.g., land), and/or multiple more specific classes of sky features (e.g., open sky, clouds, types of clouds, etc.) and/or specific classes of land (e.g., sand, beach, sandy beach, rocky beach, soil, grass, rock, bluff, etc.). As still another further example, the set of classes can include one or more classes of debris, such as one or more broad class of debris feature (e.g., debris), and/or multiple more specific classes of debris features that are often found floating in water (e.g., log, trash, algae, etc.). In some embodiments, the segmentation information can include a class corresponding to calibration target features. For example, the trained machine learning model can be trained to classify calibration targets (e.g., having a predetermined shape and/or pattern) as a separate class (e.g., rather than classifying the targets in another class, such as signs or ego vessel for targets that are mounted to and/or integrated into the vessel).

In some embodiments, process 300 can use segmentation information (or other suitable object detection and/or classification information) to identify objects in the image data (and/or other data) captured at 310, and can attempt to determine whether the object(s) is an object that was previously observed (e.g., in the same or a similar relative location to the vessel).

In some embodiments, process 300 can generate and/or update an occupancy grid in real-time based on recent measurements of a portion of the environment within a predetermined range of the proximity sensors(s). In some embodiments, cells in the occupancy grid can be associated with local coordinates (e.g., based on the global coordinate system), and can be associated with a geographic coordinate system (e.g., latitude and longitude). In such an example, the local coordinates can be defined based on linear measurements indicating placement of the cell (e.g., distance from an origin along two or more axes) and/or radial measurements (e.g., radial distance from one or more axes). A transform can define a relationship between the local coordinates and the associated geographic coordinates. In some embodiments, when planning a path, the controller(s) can use the occupancy grid to identify portions of the environment that can be safely traversed and those that may result in a collision.

At 312, process 300 can determine whether one or more objects in an environment of the marine vessel have moved relative to a position of the object in earlier image data (e.g., by at least a threshold amount). In some embodiments, process 300 can use any suitable technique or combination of techniques to determine whether one or more objects in an environment of the marine vessel have moved relative to a position of the object in earlier image data.

For example, process 300 can use image data captured at 310 and/or image data captured previously (e.g., when the vessel was being operated, previously while the vessel was secured) to determine locations (e.g., locations relative to the vessel, locations relative to a fixed portion of the environment such as a dock or mooring ball) of one or more objects in the environment.

In some embodiments, process 300 can determine whether the object was likely present in the environment in previously captured data, and can attempt to determine whether the object(s) has moved (e.g., relative to the vessel) since it was observed in the previous data.

In some embodiments, process 300 can use classification information associated with the object to determine whether the object was likely present in the previous data. For example, process 300 can determine whether the same type of object was located in the same (or a similar) location with respect to the vessel. In such an example, process 300 can use any suitable technique or combination of techniques to determine whether the object(s) has moved. In a more particular example, process 300 can identify types of objects that are present in both the most recently captured data and the previously captured data, and can determine whether objects are in the same position based on the location of the objects in the data. As another more particular example, process 300 can identify types of objects that are present in an occupancy grid before and after updating the occupancy grid using the data captured at 310.

In some embodiments, process 300 can determine whether only certain classes of objects have moved (e.g., vessels over a predetermined size, mooring balls, docks, land, buoys, etc.). Additionally or alternatively, in some embodiments, process 300 can determine whether objects of at least a predetermined size (e.g., large enough to damage the vessel) have moved a significant amount. Additionally or alternatively, in some embodiments, process 300 can determine whether only objects relatively close to the vessel have moved (e.g., within a 25 meter radius).

In some embodiments, process 300 can determine whether any of the objects have moved more than a predetermined amount. For example, as described above, process 300 can determine whether an object to which the vessel was secured has moved more than a predetermined amount relative to the vessel (e.g., which can depend on the type of object). In such an example, movement of the object to which the vessel was secured can indicate that the vessel has become at least partially unmoored from the object and/or that the vessel is drifting.

As another example, process 300 can determine whether a potentially mobile object in the environment (e.g., another vessel, a floating dock, debris, etc.) has moved relative to the vessel (e.g., if the vessel is expected to be relatively static) and/or relative to one or more fixed objects in the environment (e.g., an object to which the vessel is secured, a navigation aid, a fixed dock, etc.). In some embodiments, a threshold amount of movement can depend on a distance from the vessel. For example, process 300 can determine that an object has moved by a significant amount if the object is relatively close to the vessel (e.g., within 25 meters) and has moved a relatively small amount (e.g., two meters, 10% of the size of the object, etc.). As another example, process 300 can determine that an object has moved by a significant amount if the object is relatively far from the vessel (e.g., more than 25 meters) and has moved a relatively large amount (e.g., at least five meters, 100% of the size of the object, etc.). As yet another example, if the potentially mobile object is an object to which the vessel is secured (e.g., a floating dock, mooring ball, etc.), process 300 can determine that the object has moved based on amounts described above in connection with objects to which the vessel is secured.

If process 300 determines that no objects have moved by at least a threshold amount ("NO" at 314), process 300 can return to 302 (e.g., to determine whether a user has acted to change the vessel from secured to un-secured). Otherwise, if process 300 determines that one or more objects have moved by at least the threshold amount ("YES" at 314), process 300 can move to 316.

At 316, process 300 can generate a collision alert. In some embodiments, process 300 can use any suitable technique or combination of techniques to generate a collision alert, such an alert can be in any suitable format, and/or such an alert can be provided to any suitable controller and/or location in memory. For example, the collision alert generated at 316 can be formatted as a message (e.g., from sensor processor 70 to central controller 24) that indicates that there may be an elevated collision risk due to the ego vessel and/or another object having moved a significant amount. Such a message can be an asynchronous message, or can be included in a synchronous transmission. As another example, the collision alert can be formatted as a flag in a message that is sent periodically (e.g., at regular and/or irregular intervals). In a more particular example, such a flag can be set to a first value if collision risk is not elevated, can be set to a second value if collision risk is elevated and/or if a collision is likely. Additionally, in some embodiments, can be set to a second value if collision risk is elevated (e.g., which can cause an increase in monitoring frequency), and can be set to a third value if a collision is likely.

In some embodiments, the collision alert can be presented (e.g., as described below in connection with process 400 of FIG. 4), and/or process 300 can cause the collision alert to be presented to a user.

Additionally or alternatively, the generation of the collision alert can generate any other suitable action(s). For example, an initial collision alert can cause data to be captured more frequently (e.g., at 310), and the additional data can be used to estimate whether a risk of collision has increased and/or is likely to occur within a predetermine period of time (e.g., within an hour). In such an example, additional data captured at 310 can be used to determine whether an object that has moved in the environment continues moving (e.g., is likely to be adrift), and/or is moving toward the vessel.

Figure 4:
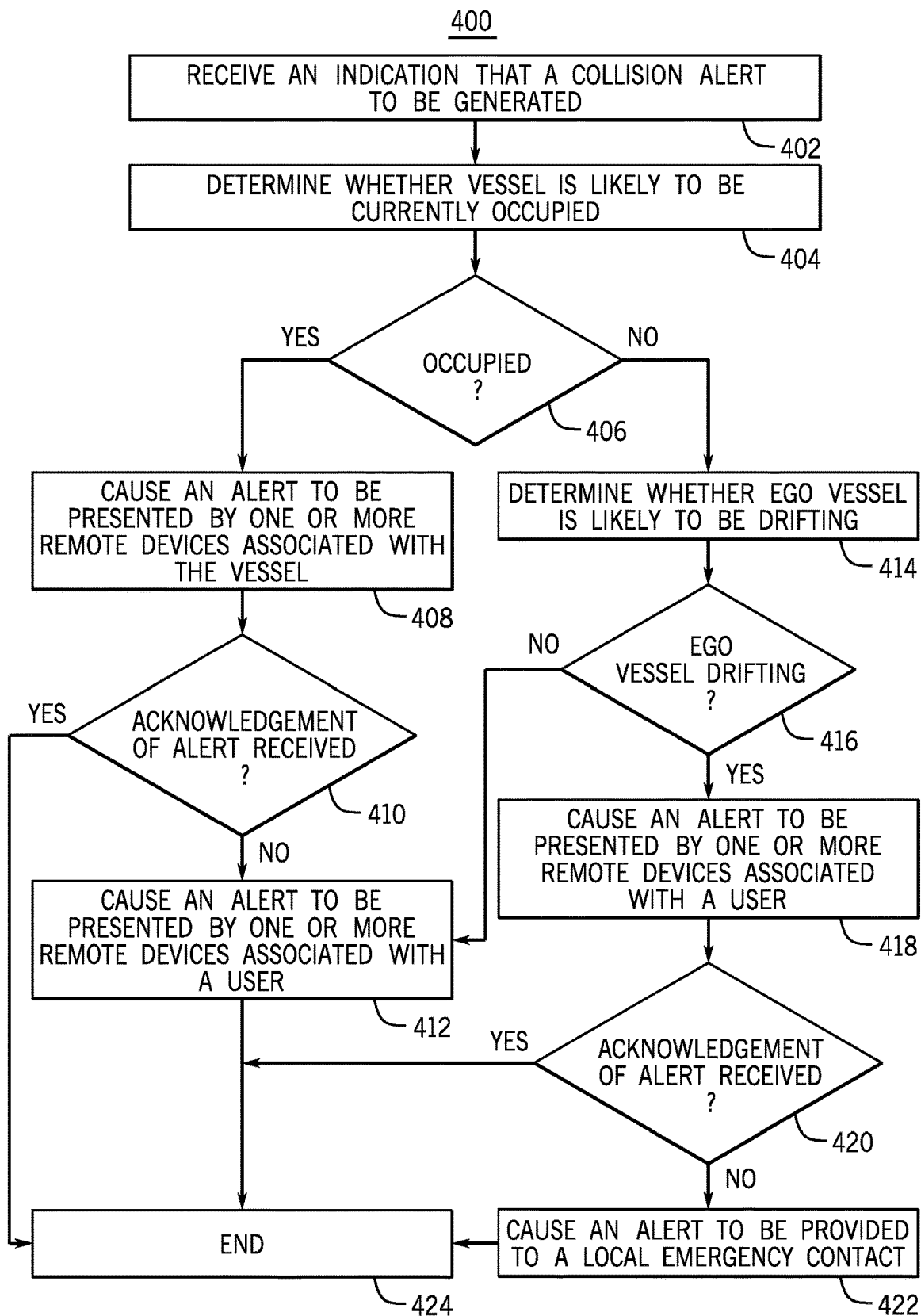
FIG. 4 shows an example of a process for presenting a collision alert for a secured marine vessel in accordance with some embodiments of the disclosed subject matter.

FIG. 4 shows an example of a process 400 for presenting a collision alert for a secured marine vessel in accordance with some embodiments of the disclosed subject matter.

At 402, process 400 can receive an indication that a collision alert is to be generated using any suitable technique or combination of techniques. For example, as described above in connection with 316 of FIG. 3, process 400 can receive an indication that a collision alert is to be generated based on movement of one or more objects in an environment of the vessel (e.g., "YES" at 314). As another example, process 400 can receive an indication that a collision alert is to be generated based on a message generated at 316.

At 404, process 400 can determine whether the vessel is likely to be currently occupied. In some embodiments, process 400 can use any suitable technique or combination of techniques to determine that the device is likely to be currently occupied. For example, one or more sensors (e.g., depth sensors 72-78) can be used to determine that a person has boarded the vessel and/or has left the vessel. In such an example, a controller (e.g., sensor processor 70, CCM 24) can maintain a count of people that are likely to be on board the vessel.

As another example, one or more wearable and/or portable devices (e.g., wireless fobs such as 1ST MATE devices available from BRUNSWICK CORP; smartphones; applications installed on a smartphone or wearable, such as the SMARTCRAFTCONNECT or MERCURY MARINE; etc.), can be used to monitor whether a person wearing/associated with the device is on the vessel. In such an example, if any such devices are detected, process 400 can determine that the vessel is occupied, and otherwise can determine that the vessel is not occupied.

As yet another example, a mode of the vessel can be used to determine whether the vessel is occupied. In a more particular example, if the vessel is in an accessory mode and/or a generator is being operated, process 400 can determine that the vessel is likely occupied. As another more particular example, if the vessel is in a locked down mode (e.g., in which a user interface of the vessel cannot be accessed), process 400 can determine that the vessel is likely unoccupied.

If process 400 determines that the vessel is likely occupied ("YES" at 406), process 400 can move to 408.

At 408, process 400 can cause an alert to be presented by one or more devices associated with the vessel (e.g., one or more devices local to the vessel). For example, process 400 can cause an audible alert (e.g., an alarm, a voice message, etc.) to be presented via a speaker(s) of the vessel. As another example, process 400 can cause a visual alert (e.g., a warning message) to be presented on a display(s) of the vessel. As yet another example, process 400 can cause a audio and/or visual alert (e.g., an alarm, a voice message, a warning message, etc.) to be presented by a mobile device associated with a user that is onboard the vessel (e.g., a wireless fob, a smartphone, etc.).

In some embodiments, the alert presented at 408 can include any suitable information. For example, the alert can include an indication that the vessel may be at an increased risk of collision. As another example, the alert can include an indication that the vessel may be drifting (e.g., if process 400 determines that the ego vessel may be drifting at 414). As yet another example, can include one or more images (e.g., captured by one or more of depth sensors 72-78 and/or any other suitable image sensor) that includes an object(s) that caused the alert to be generated at 402. In such an example, the image(s) can be a static image, or can be dynamically updated (e.g., video).

In some embodiments, the alert can be presented with a user interface element that can be used to acknowledge the alert and/or to take an appropriate action (e.g., to enable autonomous navigation to avoid a collision, to maintain a position, etc.). Additionally or alternatively, in some embodiments, the vessel can be configured to accept audio input (e.g., audio commands), and can listen for an audio acknowledgment of the alert by a person onboard.

At 410, process 400 can determine whether an acknowledgement of the alert presented at 408 has been received. In some embodiments, process 400 can use any suitable technique or combination of techniques to determine whether an acknowledgement of the alert presented at 408 has been received. For example, if a user selects (or otherwise manipulates) a user interface element (e.g., presented by a touchscreen display of the vessel, presented by a touchscreen of a mobile device of the user, a user interface button of a wireless fob, a particular hardware and/or software button of the vessel, a lever of the vessel, an ignition of the vessel, etc.), process 400 can receive an indication that the user has selected and/or otherwise manipulated a user interface element acknowledging the alert. In a particular example, the indication can be a message from a graphical user interface and/or operating system associated with the vessel indicating that a particular user interface element or button has been selected and/or manipulated, or that a verbal acknowledgment of the alert has been received. As another more particular example, the indication can be a message from a mobile device associated with a user (e.g., a wireless fob, a smartphone) indicating that a particular user interface element or button has been selected and/or manipulated, or that a verbal acknowledgment of the alert has been received by the mobile device.

If process 400 determines that an acknowledgment has not been received ("NO" at 410), process 400 can move to 412. For example, a person on board may be incapacitated and unable to acknowledge the alert. As another example, the vessel may not actually be occupied. In some embodiments, process 400 can wait any suitable period of time for an acknowledgment. For example, if the vessel is likely occupied (and if the ego vessel is not drifting), process 400 can wait seconds or minutes for an acknowledgement (e.g., thirty seconds, one minute, five minutes, etc.), as a user that is onboard can be expected to react to the alert relatively quickly.

At 412, process 400 can cause an alert to be presented by one or more remote devices (e.g., a smartphone, a tablet computer, a laptop computer, etc.) associated with a user. For example, process 400 can cause an audible alert (e.g., an alarm, a voice message, etc.) to be presented via a speaker(s) by the remote device. As another example, process 400 can cause a visual alert (e.g., a warning message) to be presented by the remote device.

In some embodiments, the remote device can be a device that the user has paired with the vessel (e.g., via an application on the device and an application executed by the vessel, via a cloud application with which the user has registered the vessel, etc.), and/or a device that the user has added contact details for to the vessel (e.g., via a user interface presented by the vessel). In some embodiments, the remote device can be a device associated with a company paid by an owner of the vessel to monitor the vessel. Identifying information of such devices can be stored in memory of the vessel (e.g., memory 232, memory associated with CCM 24, etc.), and/or in memory of a remote server (e.g., a cloud server), and such identifying information can be used to transmit the alert to the remote device (e.g., using communication systems 230 and/or any other suitable communication system of the vessel). In some embodiments, any suitable contact information can be used to transmit the alert, such as a telephone number, an email address, a username (e.g., for an application executed by the remote device and/or an application executed by the vessel), a device ID (e.g., an international mobile equipment identity (IMEI)), an IP address, etc.

In some embodiments, the alert presented at 412 can include any suitable information. For example, the alert can include an indication that the vessel may be at an increased risk of collision. As another example, the alert can include an indication that the vessel may be drifting (e.g., if process 400 determines that the ego vessel may be drifting at 414). As yet another example, can include one or more images (e.g., captured by one or more of depth sensors 72-78 and/or any other suitable image sensor) that includes an object(s) that caused the alert to be generated at 402. In such an example, the image(s) can be a static image, or can be dynamically updated (e.g., video).

In some embodiments, the alert can be presented with a user interface element that can be used to acknowledge the alert and/or to take an appropriate action (e.g., to enable autonomous navigation to avoid a collision, to maintain a position, etc.). Additionally or alternatively, in some embodiments, the vessel can be configured to accept audio input (e.g., audio commands), and can listen for an audio acknowledgment of the alert by a person onboard.

Otherwise, if process 400 determines that an acknowledgment has been received ("YES" at 410), process 400 can move to 424, and process 400 can end.

If process 400 determines that the vessel is unlikely to be occupied ("NO" at 406), process 400 can move to 414.

At 414, process 400 can determine whether the ego vessel is likely to be drifting based on the collision alert, and/or the location of one or more objects in the environment. In some embodiments, process 400 can use any suitable technique or combination of techniques to determine that the ego vessel is likely to be drifting. For example, if the object(s) that has moved by at least a significant amount (at 312) is a structure or object to which the ego vessel was secured, process 400 can determine that the ego vessel is likely to be drifting.

As another example, process 400 can access and/or retrieve location information (e.g., recorded by a GPS receiver of vessel, such as GPS receiver 40), and if the location information indicates that the vessel has moved by at least a predetermined distance (e.g., from one or more mooring points), process 400 can determine that the vessel is likely drifting.

As yet another example, process 400 can access and/or retrieve acceleration information (e.g., recorded by one or more IMUs, such as main IMU 36 and/or one or more of IMUs 62-68), and if the acceleration information indicates that the vessel has moved by at least a predetermined lateral distance from the secured location, process 400 can determine that the vessel is likely drifting.

If process 400 determines that the vessel is not likely to be drifting ("NO" at 416), process 400 can move to 412. Otherwise, if process 400 determines that the vessel is likely to be drifting ("YES" at 416), process 400 can move to 418.

At 418, process 400 can cause an alert to be presented by one or more remote devices associated with a user, and can wait for an acknowledgment of the alert and/or for a remote user to take further action. In some embodiments, process 400 can use any suitable technique or combination of techniques to cause the alert to be presented by the remote device(s), such as techniques described above in connection with 412.

At 420, process 400 can determine whether an acknowledgement of the alert presented at 418 has been received (e.g., using techniques described above in connection with 408 and 410). In some embodiments, process 400 can wait any suitable period of time for an acknowledgment. For example, if the vessel is unlikely to be occupied (and/or if the ego vessel is drifting), process 400 can wait a relatively short amount of time (e.g., seconds or minutes) for an acknowledgement (e.g., thirty seconds, one minute, five minutes, etc.), as the vessel is relatively likely to be imminently damaged if the vessel is drifting.

If process 400 determines that an acknowledgment has been received ("YES" at 420), process 400 can move to 424, and can end. Otherwise, if process 400 determines that an acknowledgment has not been received ("NO" at 420), process 400 can move to 422. In some embodiments, if the ego vessel is likely to be drifting and a user associated with the vessel has not responded, process 400 can escalate the alert to another user and/or a local emergency contact.

At 422, process 400 can cause an alert to be provided to a local emergency contact. In some embodiments, process 400 can use any suitable technique or combination of techniques to contact an emergency contact. For example, process 400 can use contact information that has been provided for a user to contact in case of emergency (e.g., a company paid by an owner of the vessel to monitor the vessel, a user designated by a main user of the vessel, etc.) to transmit the alert to another remote device. As another example, process 400 can use emergency contact information (e.g., provided by a user, accessed from a database of emergency contacts by location, etc.) to transmit an alert to a local emergency contact (e.g., a harbormaster, a dockmaster, a marina employee, emergency services such as fire rescue, law enforcement, Coast Guard, etc.). As yet another example, process 400 can use an emergency channel (e.g., an emergency radio channel) and/or an emergency message on a general channel to transmit an alert to a local emergency contact.

In some embodiments, the alert provided at 422 can be similar to an alert provided at 412 and/or 418, or can include any other suitable information. For example, if an emergency contact can only be contacted via phone or another audio communication channel, the alert can include information indicating the nature of the emergency and the current location of the vessel.

Further Examples Having a Variety of Features

Implementation examples are described in the following numbered clauses:

1. A method for detecting collision risk to a secured marine vessel using a vision system of the marine vessel, the method comprising: determining that the marine vessel is secured; determining, based on image data generated by one or more of a plurality of cameras, that the marine vessel is at an increased risk of collision; and generating a collision alert based on the increased risk of collision.

2. The method of clause 1, further comprising: determining that the marine vessel is occupied; and causing a device associated with the marine vessel to present the collision alert.

3. The method of clause 2, further comprising: determining, after a predetermined period of time, that a user acknowledgment of the collision alert has not been received; and in response to determining that the user acknowledgment of the collision alert has not been received, causing the collision alert to be transmitted to a remote computing device associated with a particular user.

4. The method of any one of clauses 1 to 3, further comprising: determining that the marine vessel is unoccupied; and causing the collision alert to be transmitted to a remote computing device associated with a particular user.

5. The method of any one of clauses 1 to 4, wherein the collision alert comprises an image captured by one of the plurality of cameras.

6. The method of any one of clauses 1-5, further comprising: receiving, via a user interface presented by a computing device, input indicating that the marine vessel is secured; and in response to receiving the input, determining that the marine vessel is secured.

7. The method of any one of clauses 1-6, further comprising: causing the plurality of cameras to capture image data at a reduced rate based on the determination that the marine vessel is secured.

8. The method of clause 7, further comprising: causing the plurality of cameras to capture image data at a first rate during a period when the marine vessel is being operated and is underway, wherein the reduced rate captures image data at no more than ten percent of the first rate.

9. The method of clause 8, wherein the first rate is at least 30 times per second.

10. The method of any one of clauses 1 to 9, further comprising: determining, based on the image data generated by the one or more of the plurality of cameras, that the marine vessel is adrift, wherein the increased risk of collision is based on the determination that the marine vessel is adrift; and in response to determining that the marine vessel is adrift, including an indication in the collision alert that the marine vessel is adrift.

11. The method of clause 10, further comprising: determining, after a predetermined period of time, that a user acknowledgment of the collision alert has not been received; and in response to determining that the user acknowledgment of the collision alert has not been received, causing the collision alert to be transmitted to a device associated with emergency services.

12. The method of any one of clauses 1 to 11, further comprising: determining, based on the image data generated by the one or more of the plurality of cameras, that a distance to an object in the environment of at least a predetermined size has decreased by at least a threshold amount within a predetermined period of time, wherein the increased risk of collision is based on the determination that the distance to the object in the environment has decreased by at least the threshold amount within the predetermined period of time.

13. The method of any one of clauses 1 to 12, further comprising: determining a position of the marine vessel at a time at which the marine vessel was secured; determining that the marine vessel has moved at least a predetermined distance from the position of the marine vessel at the time at which the marine vessel was secured; and in response to determining that the marine vessel has moved at least the predetermined distance, causing the plurality of cameras to capture image data.

14. The method of any one of clauses 1 to 13, further comprising: in response to determining that the marine vessel is at the increased risk of collision, causing the plurality of cameras to capture image data at an increased rate for at least a predetermined period of time; and determining, based on image data generated by one or more of the plurality of cameras during the predetermined period of time, a collision is likely within a second predetermined period of time.

15. A system comprising: one or more processors configured to: perform a method of any of clauses 1 to 14.

16. A non-transitory computer-readable medium storing computer-executable code, comprising code for causing a computer to cause a processor to: perform a method of any of clauses 1 to 14.

In some embodiments, any suitable computer readable media can be used for storing instructions for performing functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that above-described steps of the processes of FIG. 5 can be executed or performed in any suitable order or sequence not limited to the order and sequence shown and described in the figures. Also, some of the above steps of the processes of FIG. 5 can be executed or performed substantially simultaneously where appropriate or in parallel to reduce latency and processing times.

This written description uses examples to disclose the invention(s), including the best mode, and also to enable any person skilled in the art to make and use the invention(s). Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention(s) is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for detecting collision risk to a secured marine vessel using a vision system of the marine vessel, the system comprising:
   a plurality of cameras, including at least a first camera and a second camera,
      wherein each of the plurality of cameras is configured to be mounted to the marine vessel with an associated field of view of an environment of the marine vessel;
   one or more hardware processors configured to:
      determine that the marine vessel is secured;
      cause the plurality of cameras to capture image data at a reduced rate based on the determination that the marine vessel is secured;
      determine, based on image data generated by one or more of the plurality of cameras, that the marine vessel is at an increased risk of collision; and
      generate a collision alert based on the increased risk of collision.

2. The system of claim 1, wherein the one or more hardware processors are further configured to:
   determine that the marine vessel is occupied; and
   cause a device associated with the marine vessel to present the collision alert.

3. The system of claim 2, wherein the one or more hardware processors are further configured to:
   determine, after a predetermined period of time, that a user acknowledgment of the collision alert has not been received; and
   in response to determining that the user acknowledgment of the collision alert has not been received, cause the collision alert to be transmitted to a remote computing device associated with a particular user.

4. The system of claim 1, wherein the one or more hardware processors are further configured to:
   determine that the marine vessel is unoccupied; and
   cause the collision alert to be transmitted to a remote computing device associated with a particular user.

5. The system of claim 1, wherein the collision alert comprises an image captured by one of the plurality of cameras.

6. The system of claim 1, wherein the one or more hardware processors are further configured to:
   receive, via a user interface presented by a computing device, input indicating that the marine vessel is secured; and
   in response to receiving the input, determine that the marine vessel is secured.

7. The system of claim 1, wherein the one or more hardware processors are further configured to:
   cause the plurality of cameras to capture image data at a first rate during a period when the marine vessel is being operated and is underway,
      wherein the reduced rate captures image data at no more than ten percent of the first rate.

8. The system of claim 7, wherein the first rate is at least 30 times per second.

9. The system of claim 1, wherein the one or more hardware processors are further configured to:
   determine, based on the image data generated by the one or more of the plurality of cameras, that the marine vessel is adrift,
      wherein the increased risk of collision is based on the determination that the marine vessel is adrift; and
   in response to determining that the marine vessel is adrift, include an indication in the collision alert that the marine vessel is adrift.

10. The system of claim 9, wherein the one or more hardware processors are further configured to:
   determine, after a predetermined period of time, that a user acknowledgment of the collision alert has not been received; and
   in response to determining that the user acknowledgment of the collision alert has not been received, cause the collision alert to be transmitted to a device associated with emergency services.

11. The system of claim 1, wherein the one or more hardware processors are further configured to:
   determine, based on the image data generated by the one or more of the plurality of cameras, that a distance to an object in the environment of at least a predetermined size has decreased by at least a threshold amount within a predetermined period of time,
      wherein the increased risk of collision is based on the determination that the distance to the object in the environment has decreased by at least the threshold amount within the predetermined period of time.

12. The system of claim 1, wherein the one or more hardware processors are further configured to:
   determine a position of the marine vessel at a time at which the marine vessel was secured;
   determine that the marine vessel has moved at least a predetermined distance from the position of the marine vessel at the time at which the marine vessel was secured; and
   in response to determining that the marine vessel has moved at least the predetermined distance, cause the plurality of cameras to capture image data.

13. The system of claim 1, wherein the one or more hardware processors are further configured to:

in response to determining that the marine vessel is at the increased risk of collision, cause the plurality of cameras to capture image data at an increased rate for at least a predetermined period of time; and determine, based on image data generated by one or more of the plurality of cameras during the predetermined period of time, a collision is likely within a second predetermined period of time.

14. A method for detecting collision risk to a secured marine vessel using a vision system of the marine vessel, the method comprising:

determining that the marine vessel is secured;

causing a plurality of cameras to capture image data at a reduced rate based on the determination that the marine vessel is secured determining, based on image data generated by one or more of the plurality of cameras, that the marine vessel is at an increased risk of collision; and generating a collision alert based on the increased risk of collision.

15. The method of claim 14, further comprising:

determining that the marine vessel is occupied; and causing a device associated with the marine vessel to present the collision alert.

16. The method of claim 15, further comprising:

determining, after a predetermined period of time, that a user acknowledgment of the collision alert has not been received; and in response to determining that the user acknowledgment of the collision alert has not been received, causing the collision alert to be transmitted to a remote computing device associated with a particular user.

17. The method of claim 14, further comprising:

determining that the marine vessel is unoccupied; and causing the collision alert to be transmitted to a remote computing device associated with a particular user.

18. The method of claim 14, wherein the collision alert comprises an image captured by one of the plurality of cameras.

19. The method of claim 14, further comprising:

receiving, via a user interface presented by a computing device, input indicating that the marine vessel is secured; and in response to receiving the input, determining that the marine vessel is secured.

20. A system for detecting collision risk to a secured marine vessel using a vision system of the marine vessel, the system comprising:

a plurality of cameras, including at least a first camera and a second camera, wherein each of the plurality of cameras is configured to be mounted to the marine vessel with an associated field of view of an environment of the marine vessel;

one or more hardware processors configured to:

determine that the marine vessel is secured;

determine a position of the marine vessel at a time at which the marine vessel was secured;

determine that the marine vessel has moved at least a predetermined distance from the position of the marine vessel at the time at which the marine vessel was secured;

in response to determining that the marine vessel has moved at least the predetermined distance, cause the plurality of cameras to capture image data;

determine, based on image data generated by one or more of the plurality of cameras, that the marine vessel is at an increased risk of collision; and generate a collision alert based on the increased risk of collision.

\* \* \* \* \*